(12) United States Patent
Yabe

(10) Patent No.: US 6,286,203 B1
(45) Date of Patent: *Sep. 11, 2001

(54) METHOD OF INSTALLING WIRE HARNESS

(75) Inventor: Kazuyoshi Yabe, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,678

(22) Filed: Aug. 7, 1997

(30) Foreign Application Priority Data

Aug. 8, 1996 (JP) .................................................. 8-209979

(51) Int. Cl.[7] .................................................. H01R 43/00
(52) U.S. Cl. .................................. 29/825; 29/854; 29/857
(58) Field of Search .................................. 29/33 M, 428, 29/825, 854–59, 868, 462, 869; 296/96.21

(56) References Cited

FOREIGN PATENT DOCUMENTS 1-212636    8/1989  (JP) .

*Primary Examiner*—Lee Young
*Assistant Examiner*—Sean Smith
(74) *Attorney, Agent, or Firm*—Armstrong, Westerman, Hattori, McLeland & Naughton, LLP

(57) ABSTRACT

A method of installing a wire-harness which interconnects electric circuits provided at the inside and outside of a compartment of a motor vehicle. When a wind shield is bonded and fixed to a window frame of a vehicle body, a flat cable is disposed and embedded simultaneously at a portion of bonding wind shield at where the inside and outside of the compartment is partitioned. The circuit provided at the outside of the compartment is thus connected to the circuit provided at the inside of the compartment through the embedded flat cable at the portion of bonding wind shield.

5 Claims, 6 Drawing Sheets

METHOD OF INSTALLING WIRE HARNESS

FIELD OF THE INVENTION

The present invention relates to a method of installing a wire-harness which interconnects circuits provided inside and outside the compartment of a motor vehicle, more particularly, to a method of installing wire-harness which is capable of enhancing waterproofing, also installing a wire-harness easily between the inside and the outside of the compartment of the motor vehicle, and furthermore economizing the use of space at the rear side of an instrument panel on which various components and units are assembled.

DESCRIPTION OF THE RELATED ART

As shown in FIG. 6, in case of connecting circuits provided at outer rooms A, A' other than a passenger room or a compartment, such as an engine room and a trunk room, with circuits provided at the compartment B, through holes are formed at a body panel 101 partitioning the outer room A and the compartment B and a body panel 102 partitioning the compartment B and the outer room A', and wire-harnesses are passed through the through holes. In this way, wire-harnesses are installed from the outer rooms A and A' into the compartment B.

Specifically, as shown in FIGS. 7A and 7B and FIG. 8, a through hole 101a (102a) is formed in a body panel 101 (102), and a wire-harness 120 is held hermetically in the through hole 101a (102a) with use of a rubber grommet 110. The rubber grommet 110 is fitted into the through hole 101a so that waterproofing and soundproofing are obtained between the through hole 101a (102a) and the wire-harness 120.

However, in the aforementioned conventional method for installing a wire-harness, although an immersion of water from an abutment between the through hole 101a (102a) and the wire-harness 120 can be prevented by the grommet 110, there has been a problem that water immerses into the compartment B from the outer room A or A' conveyed along taped wires 121 and 122 and therefore reliable waterproofing could not be obtained.

In addition, in order to introduce the wire-harness 120 from the outer room A (A') into the compartment B, the conventional method has required a specific works of forming the through hole 101a (102a) in the body panel 101 (102), inserting the wire-harness 120 through the through hole 101a (102a), and then fitting the grommet 110 into the through hole 101a (102a) after the insertion of the wire-harness 120. Consequently, there has been such problems that it takes considerable working time to install the wire-harness 120.

Furthermore, the body panel 101 at the front side of the motor vehicle, as shown in FIG. 6, is positioning at the rear side of an instrument panel on which various components and units are assembled concentrically. For this reason, there has been caused the problem that it is difficult to provide a space for installing the wire-harness 120 to the body panel 101.

It is therefore an object of the present invention to provide a method of installing a wire-harness which is capable of enhancing waterproofing and installing a wire-harness easily between the inside and the outside of the compartment.

Another object of the present invention is to provide a method of installing a wire-harness which is capable of economizing a space at the rear side of an instrument panel on which various components and units are assembled concentrically.

SUMMARY OF THE INVENTION

To achieve the aforementioned objectives, there is provided a method for installing a wire-harness which interconnects electrical circuits provided at the inside of a compartment of a motor vehicle and electrical circuits provided at the outside or rooms other than the compartment. When a wind shield is fixed to a window frame of a vehicle body by a bonding agent, a flat cable is disposed at a portion of bonding of the wind shield where partitions the inside and outside of the compartment. Thus the electrical circuits provided at the outside of the compartment can be connected to the circuits provided at the inside of the compartment through the flat cable.

According to the method described above, when the wind shield is fixed to the window frame, the flat cable for interconnecting the electrical circuits provided at the inside and outside of the compartment can easily be disposed at the portion of bonding of the wind shield. Therefore, the installation of the wire-harness from the inside of the compartment to the outside of the compartment can be easily facilitated. That is, the work of disposing the flat cable is carried out simultaneously with the work of fixing the wind shield to the window frame, so that the present invention does not require any special wiring operation such as inserting the wire-harness through the through hole provided in the body panel and then fitting the grommet into the through hole afterward as in the aforementioned conventional method of installation.

Moreover, the compartment can be hermetically sealed by a bonding agent filled between the edge of the front wind shield and the window frame at the portion of bonding the wind shield. Therefore, according to the present invention, in spite of not employing a grommet, a reliable waterproofing can be obtained. Furthermore, since the flat cable is disposed at the portion of bonding wind shield, an additional installation space is not needed and therefore the space at the rear side of the instrument panel can be economized.

In one aspect of the present invention, among the wire-harness which interconnects electric circuits within the compartment and electric circuits mounted at the outside the compartment, only a portion which passes over the portion of bonding the wind shield is formed into a flat cable. Therefore, if the flat cable is disposed at the portion of bonding wind shield, the wire-harness connected to electric circuits at the outside of the compartment can be connected to the wire-harness being connected to electric circuits within the compartment at any time by means of such flat cable. Consequently, the wire-harnesses are not obstructive to other assembling works.

In another aspect of the present invention, the entire portion of the wire-harness which interconnects electric circuits provided within the compartment and electric circuits provided at the outside of the compartment consists of a flat cable. With this configuration, spaces can be economized at the inside and outside of the compartment.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

Figure 1:
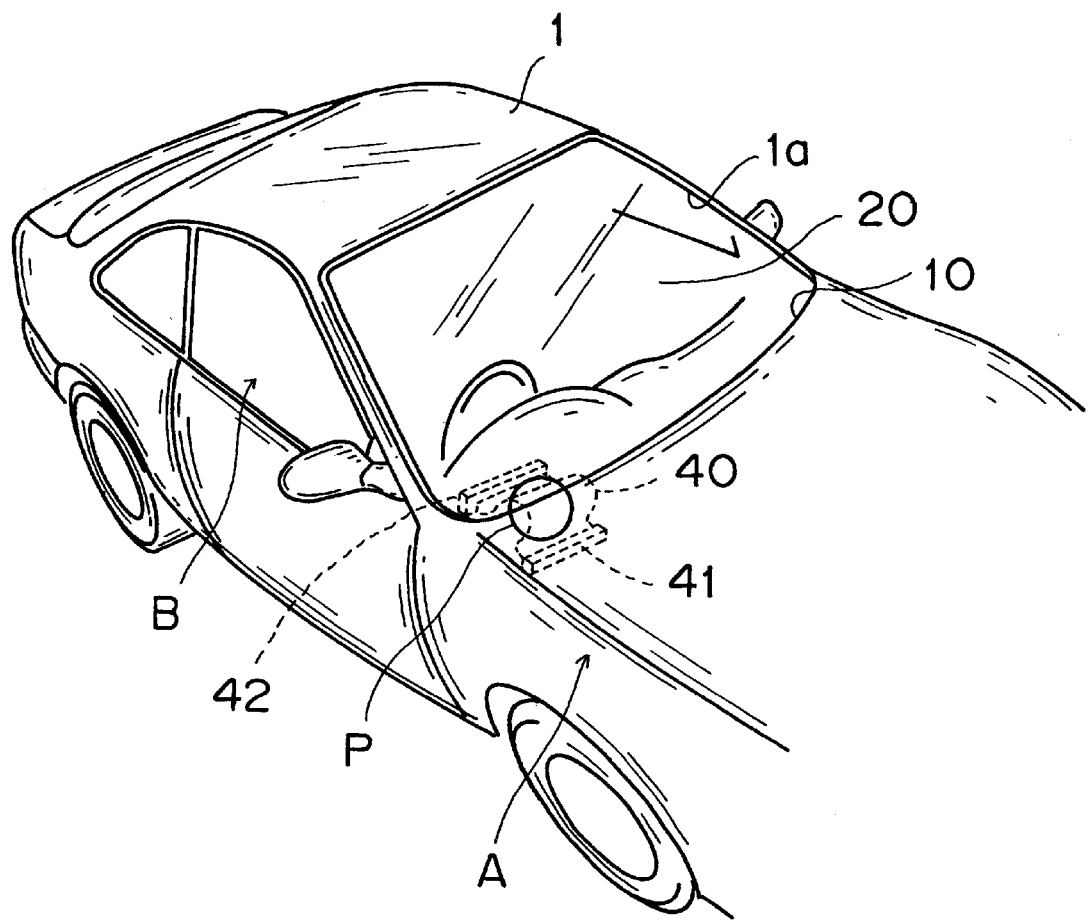
FIG. 1 is a perspective view of a motor vehicle in which a method of installing a wire-harness is carried out according to an embodiment of the present invention.

Referring to FIG. 1, there is shown a motor vehicle in which a method of installing a wire-harness is carried out according to a first embodiment of the present invention. In the method of installing wire-harness of this embodiment, wire-harness are used to interconnect electric circuits provided at the inside and outside of the compartment of the motor vehicle, whereby a flat cable is used only at the portion of bonding wind shield which will be described later.

Figure 2:
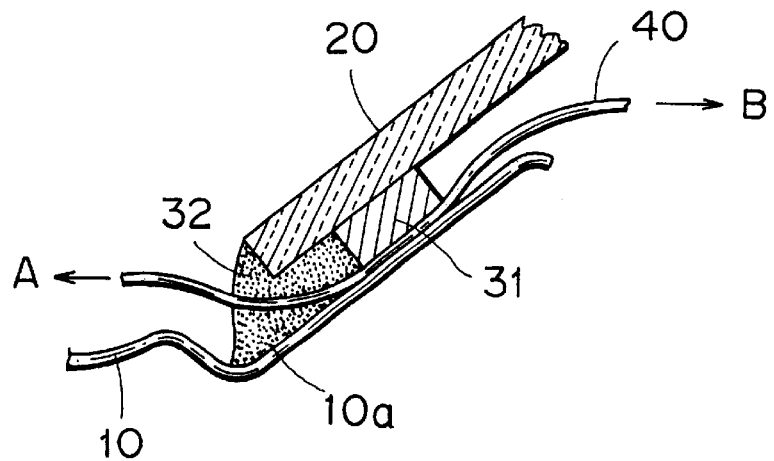
FIG. 2 is an enlarged sectional view of a P-portion of FIG. 1.

As shown in FIGS. 1 and 2, an edge portion of a body panel 10 constitutes the window frame 1a of a car body 1 and is used as a portion 10a of bonding wind shield. The lower edge portion of a front wind shield 20 is bonded and fixed to the portion 10a of bonding wind shield. More specifically, the front wind shield 20 is bonded and fixed to the portion 10a of bonding wind shield of the body panel 10 by using a bonding agent 32 to form a rubber dam 31.

Figure 3A:
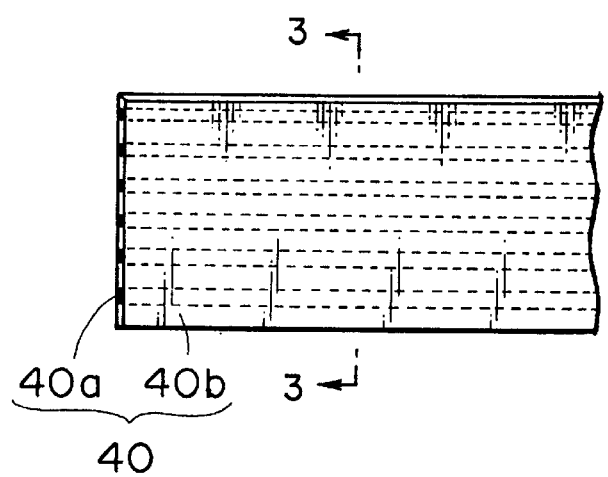
FIG. 3A is a perspective view showing a flat cable to be employed in the aforementioned method of installing a wire-harness according to the present invention.
Figure 3B:
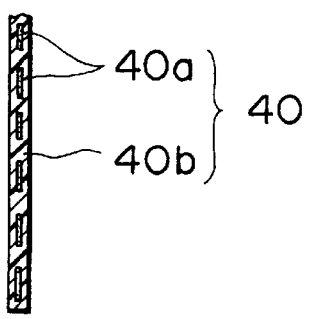
FIG. 3B is a cross sectional view of the flat cable at line 3—3 of FIG. 3A.

The method of installing a wire-harness of this embodiment is characterized in that a flat cable 40, such as that shown in FIGS. 3A and 3B, is passed over the aforementioned portion 10a of bonding wind shield 20.

The flat cable 40 consists of a plurality of thin film conductors (or flat type or rectangular conductors) 40a arranged in parallel and coated with an insulating material 40b such as of polyethylene terephthalate (PET), and the flat cable 40 constitutes a part of the wire-harness which interconnects electric circuits provided in a front room A and a circuit provided in the compartment B of a motor vehicle. The flat cable 40 has connectors 41 and 42 at the opposite ends, as shown in FIG. 1.

The flat cable 40 is passed over the portion 10a of bonding wind shield when the front wind shield 20 is bonded and fixed to the window frame 1a of the vehicle body 1. More specifically, in FIG. 2 the flat cable 40 is placed on the edge portion of the body panel 10 constituting the portion 10a of bonding wind shield. In this case, as shown in FIG. 1, the flat cable 40 is positioned so that one connector 41 of the flat cable 40 is placed in the front room A and that the other connector 42 is placed in the compartment B.

Next, the front wind shield 20 is positioned over the window frame 1a through the rubber dam 31, and the bonding agent 32 is filled between the front wind shield 20 and the portion 10a of bonding wind shield. At this time, both surfaces of the flat cable 40 are covered with the bonding agent 32, as shown in FIG. 2.

Figure 4:
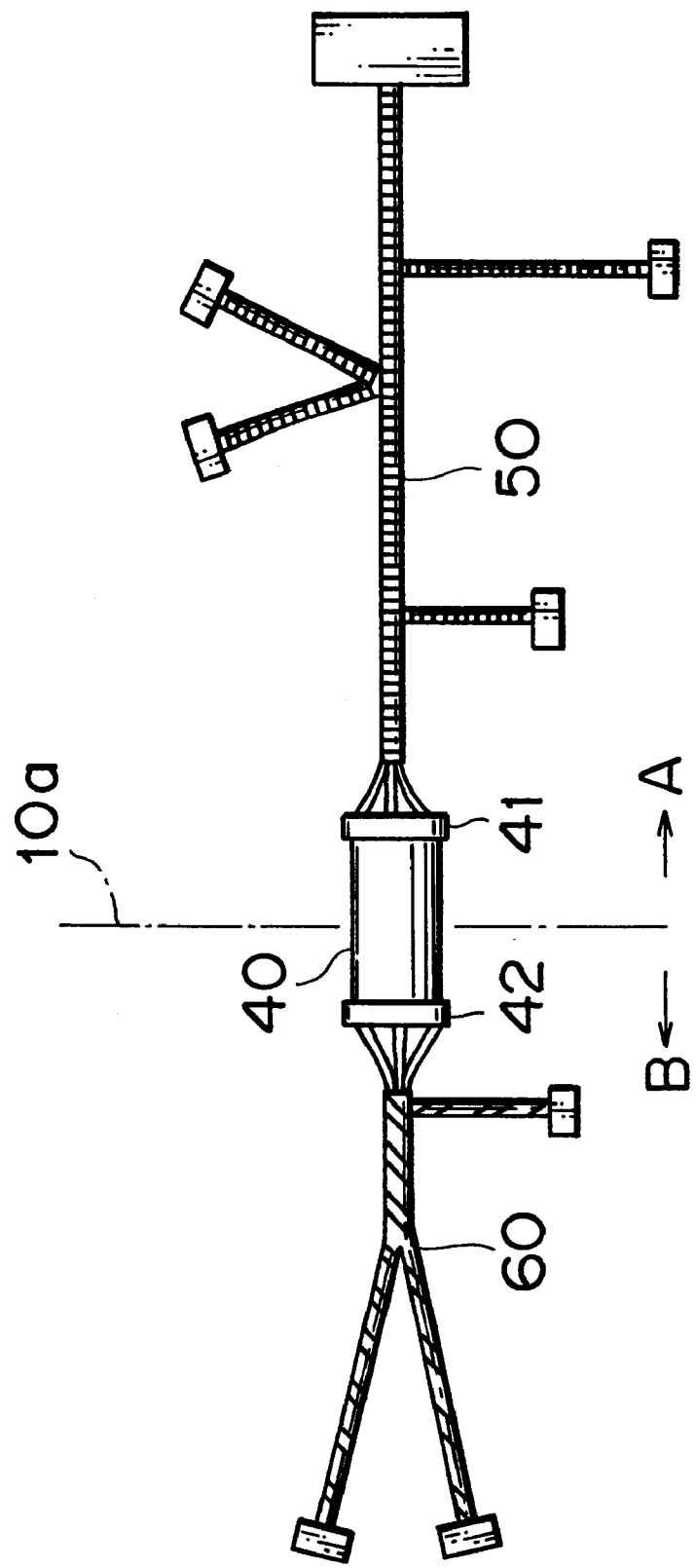
FIG. 4 is a plan view of the entire wire-harness for illustrating the method of installing the wire-harness according to one embodiment of the present invention.

Thereafter, as shown in FIG. 4, one connector 41 of the flat cable 40 is connected to a wire-harness 50 which is connected to electric circuits in the front room A, and the other connector 42 of the flat cable 40 is connected to a wire-harness 60 which is connected to electric circuits in the compartment B. Thus, the circuits in the front room A and the circuits in the compartment B are connected together by means of the flat cable 40.

Figure 7A:
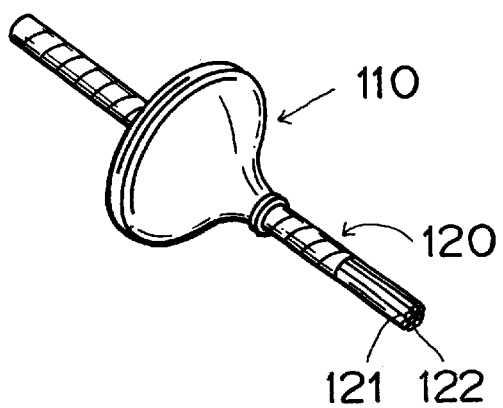
FIG. 7A is a perspective view showing a conventional method of installing wire-harness using a grommet being mounted on the wire-harness.
Figure 7B:
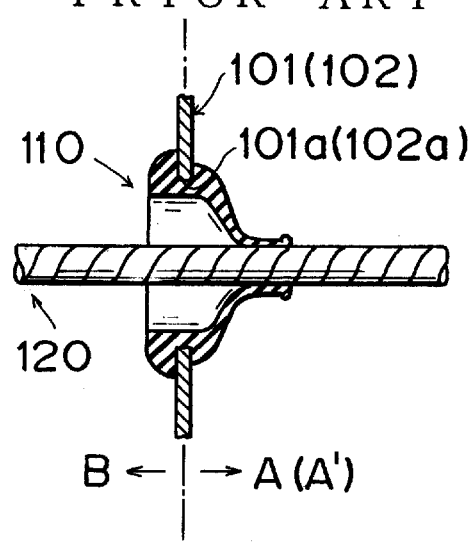
FIG. 7B is a sectional view showing the wire-harness passed through the body panel of the motor vehicle by using the grommet.
Figure 8:
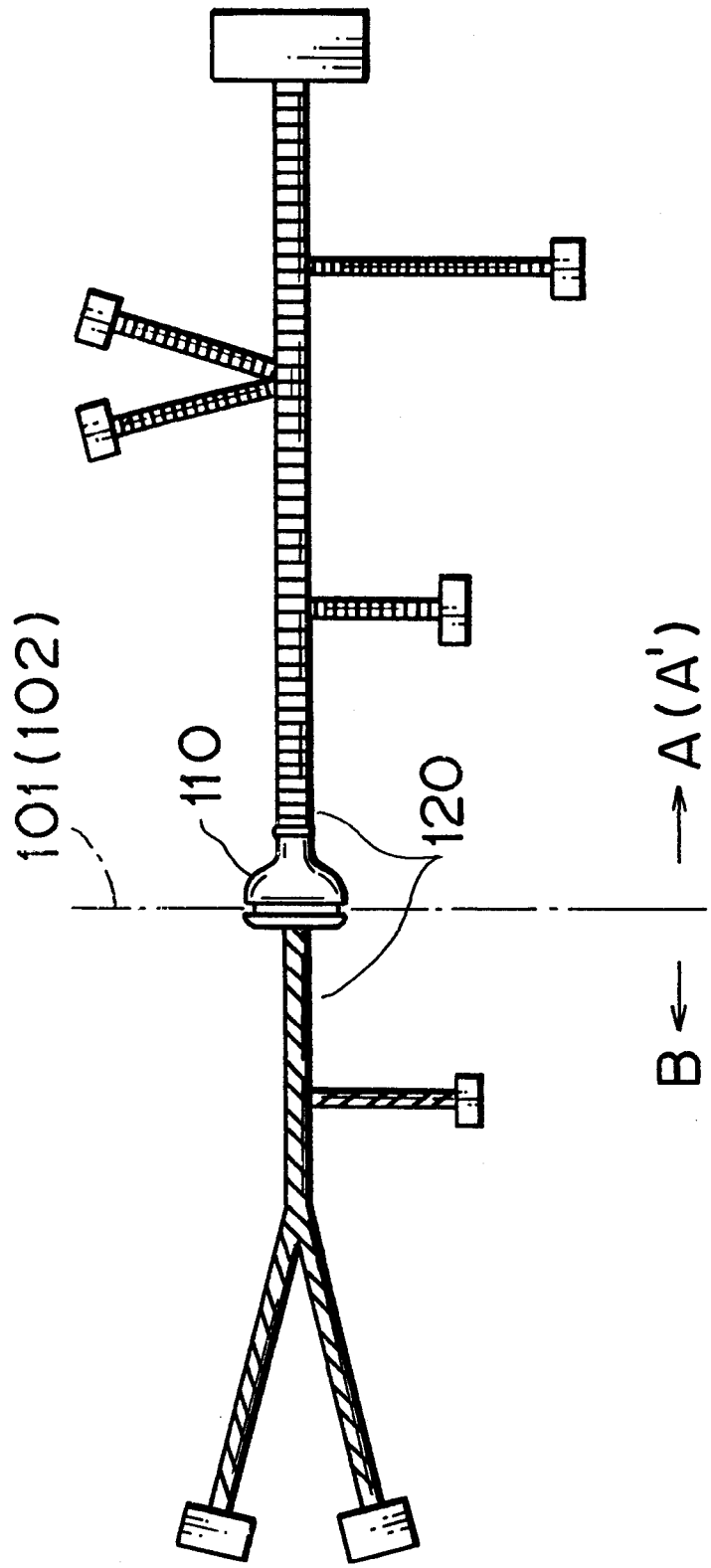
FIG. 8 is a plan view of the entire wire-harness for illustrating the method of installing a conventional wire-harness.

According to the method of installing wire-harness of the aforementioned embodiment, when the front wind shield 20 is mounted on the window frame 1a, the flat cable 40 for interconnecting circuits which are provided at the inside and outside of the compartment can easily be positioned on the portion 10a of bonding wind shield. Therefore, the flat cable 40, the wire-harnesses 50 and the wire-harness 60 can easily be installed from the front room A to the compartment B. Thus, since the operation of mounting the front wind shield 20 and the operation of installing the flat cable 40 can be performed simultaneously. Therefore, the present invention does not require any special works for installing the wire-harness such as inserting the wire-harness 120 through the through hole 101a (102a) of the body panel 101 (102) and fitting the grommet 110 into the through hole 101a as in the aforementioned conventional method of installation shown in FIG. 7. In addition, according to the present invention, the compartment B can be hermetically sealed by both the bonding agent 32 filled between the edge portion of the front wind shield 20 and the portion 10a of bonding wind shield and the rubber dam 31. Therefore, although the aforementioned embodiment does not employ a grommet, reliable waterproofing can be obtained. Furthermore, since the flat cable 40 is passed through the portion 10a of bonding wind shield, an additional space for installation of the wire-harness is not necessary and the space at the rear side of the instrument panel can be used efficiently.

Moreover, in the aforementioned embodiment, among the wire-harnesses 40, 50, and 60 for interconnecting electric circuits provided in the front room A and electric circuits provided in the compartment B, only a segment to be passed over the portion 10a of bonding wind shield is formed of the flat cable 40. Therefore, by disposing the flat cable 40 at the portion 10a of bonding wind shield, the wire-harness 50 connected to the circuits in the front room A can be connected to the wire-harness 60 connected to the circuits in the compartment B at any time through the flat cable 40. Accordingly, there is no possibility that these wire-harnesses 50 and 60 will obstruct other assembling works.

Figure 5:
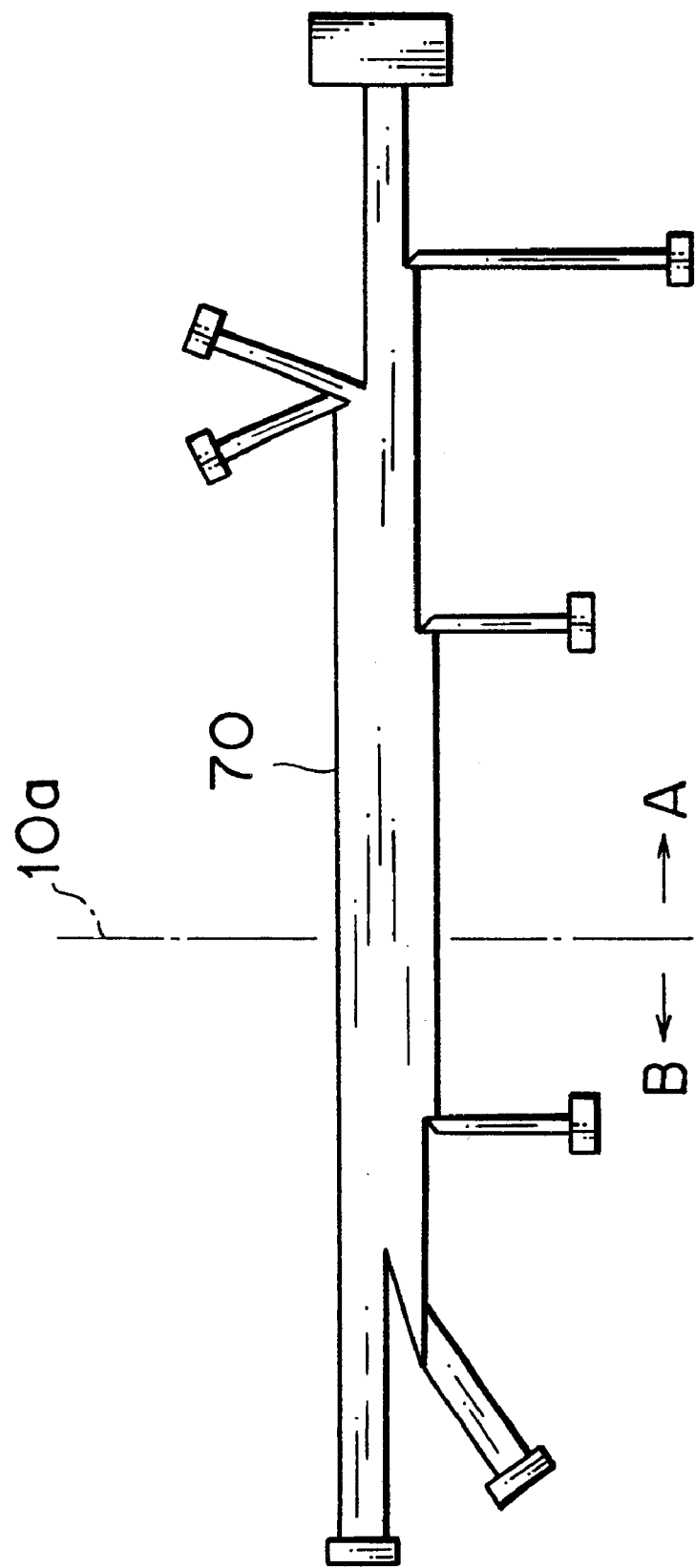
FIG. 5 is a plan view of the entire wire-harness for illustrating the method of installing the wire-harness according to another embodiment of the present invention.
Figure 6:
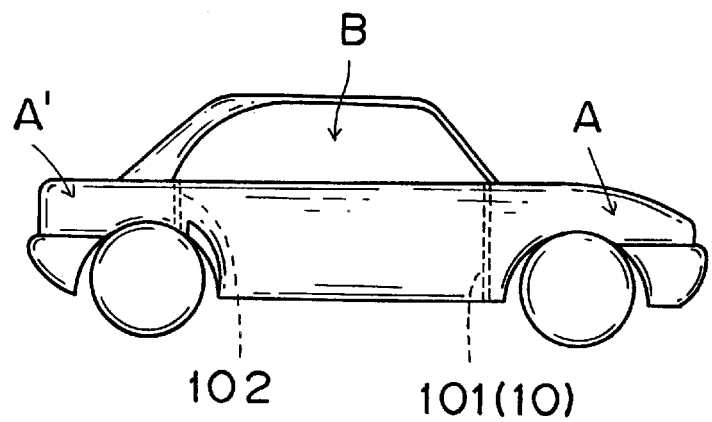
FIG. 6 is a side view of a motor vehicle showing the disposition of body panels each partitioning the inside and the outside of the compartment.

A method of installing a wire-harness will next be described according to a second embodiment of the present invention in reference to FIG. 5. FIG. 5 is a plan view of the entire wire-harness for explaining the method of installing wire-harness in accordance with the second embodiment of the present invention.

In the method of installing wire-harness of the second embodiment, all the wire-harnesses which interconnect electric circuits in the front room A and electric circuits in the compartment B are formed into a flat cable harness 70. According to the installing method of this embodiment, the space for installing a wire-harness (flat cable harness 70) can be used economically in the front room A and the compartment B.

The method of installing wire-harness of the present invention is not limited to the aforementioned embodiments.

For example, in the aforementioned embodiments, the flat cable has been provided from the front side of a motor vehicle to the compartment B via the front wind shield bonding portion, however the invention is not limited to this but the flat cable 40 (or 70) can be provided from the rear side to the compartment B via the rear side wind shield bonding portion.

According to the method of installing wire-harness of the present invention, as described above, waterproofing can also be enhanced and a wire-harness can easily be installed between the inside and outside of the compartment. In addition, a space can be economized at the rear side of an instrument panel on which various components and units are assembled concentrically.

What is claimed is:

1. A method of installing a wire harness interconnecting an electric circuit provided at an inside of a compartment of a motor vehicle and an electric circuit provided at an outside of said compartment, comprising the steps of;

disposing a continuous, uninterrupted flat cable at a portion of bonding of a wind shield to a window frame of a vehicle body where the inside and outside of said compartment are to be partitioned and said electrical circuits in said inside and said outside are to be interconnected by connectors at said inside of said compartment and at said outside of said compartment with said continuous and uninterrupted flat cable therebetween;

bonding said wind shield to said window frame of a vehicle body by applying a bonding agent between said portion of said wind shield and said window frame of a vehicle body, such that both surfaces of said flat cable are covered with bonding agent, while fixing said wind shield onto said window frame of a vehicle body at said portion of bonding said wind shield; and interconnecting said electric circuits provided at said inside and said outside of said compartment with said connectors at the opposite ends of said flat cable.

2. The method as set forth in claim 1, wherein said wire harness interconnecting said electric circuits provided at said inside and outside of said compartment is formed of a flat cable at a part of said flat cable disposed at said portion of bonding of said wind shield.

3. The method as set forth in claim 1, wherein the entire portion of said wire harness interconnecting said electric circuits provided at said inside and outside of said compartment is formed of a flat cable harness.

4. The method as set forth in any one of claims 1, 2, or 3, further including forming a rubber dam between said wind shield and said portion of said wind shield being bonded.

5. The method as set forth in claim 2, wherein said flat cable is provided with connectors at opposite ends of said flat cable for interconnecting wire harnesses connected to said electric circuits provided at said inside and outside of said compartment.

* * * * *